United States Patent [19]

Beyer

[11] 4,091,904
[45] May 30, 1978

[54] SYNCHRONIZING DEVICE

[75] Inventor: Otto Beyer, Martinsried, Germany

[73] Assignee: Carl Hurth Maschinen- und Zahnradfabrik, Munich, Germany

[21] Appl. No.: 710,467

[22] Filed: Aug. 2, 1976

[30] Foreign Application Priority Data

Sep. 2, 1975   Germany ............................ 2538882

[51] Int. Cl.² ............................................. F16D 13/66
[52] U.S. Cl. .............................. 192/107 M; 192/70.14
[58] Field of Search ............ 192/107 M, 70.14, 53 E, 192/53 F, 53 R, 53 C

[56] References Cited

U.S. PATENT DOCUMENTS

| 2,850,118 | 9/1958 | Byers | 192/107 R X |
| 2,947,388 | 8/1960 | Culbertson | 192/107 R X |
| 3,003,588 | 10/1961 | Huntress | 192/107 R X |
| 3,347,347 | 10/1967 | Hetmann | 192/107 R X |
| 3,744,604 | 7/1973 | Austen | 192/107 R X |

FOREIGN PATENT DOCUMENTS 945,445   1/1964   United Kingdom ............... 192/53 F Primary Examiner—Benjamin W. Wyche
Attorney, Agent, or Firm—Blanchard, Flynn, Thiel, Boutell & Tanis

[57] ABSTRACT

A synchronizing device for gear shift mechanisms. The synchronizing device has one of the friction cone ring members coated with a wear-resistant molybdenum sprayed thereon. The other friction cone member has a manganese-alloyed carbon steel sprayed thereon. The manganese-alloyed carbon steel consists of a steel with 0.7 to 0.9 percent carbon and 0.6 to 0.8 percent manganese. The preferred composition is 0.8 percent carbon and 0.7 percent manganese.

6 Claims, 4 Drawing Figures

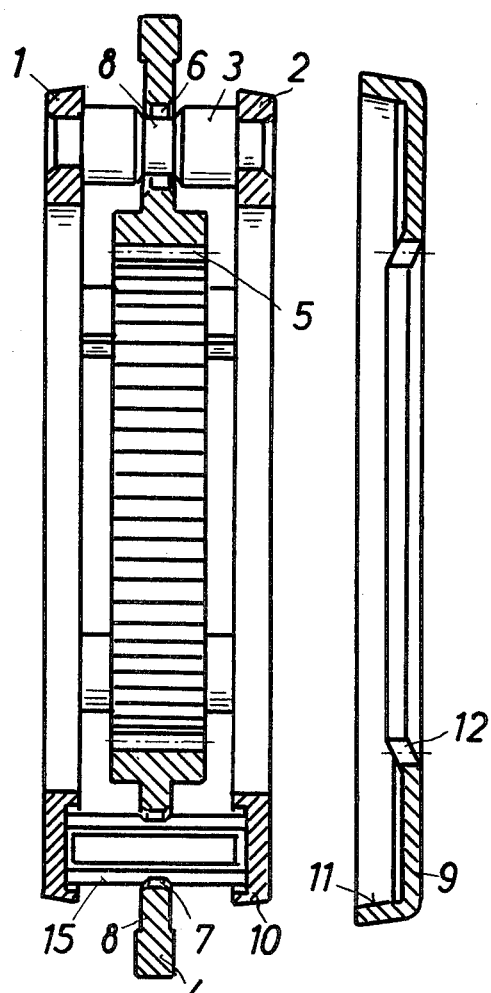
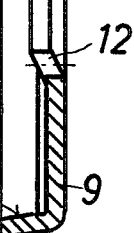
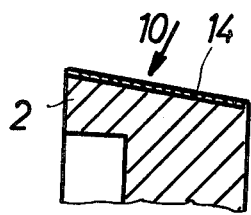
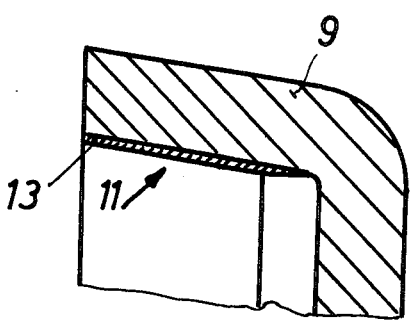

SYNCHRONIZING DEVICE

FIELD OF THE INVENTION

The invention relates to a synchronizing device and, more particularly, relates to a snychronizing device wherein one of the friction cone members has a molybdenum layer sprayed thereon and the other friction cone member has a manganese-alloyed carbon steel sprayed thereon.

BACKGROUND OF THE INVENTION

It is known to provide in synchronizing couplings one friction cone member with a sprayed-on layer of molybdenum. Molybdenum resists wear and is frictionally favorable, that is it assures, due to the coefficient of friction, a good adhesion. The other friction cone has up to now been hardened. The hardening of the member which carries the last-mentioned friction cone has so far been difficult and it becomes distorted or hardening cracks occurred, in particular if, as this is often the case, it is a cup-shaped member drawn or stamped from sheet metal.

The basic purpose of the invention is to avoid the hardening and the disadvantageous consequences which are associated therewith.

The basic purpose of the invention is attained by providing a synchronizing device which has one of the synchronizing friction cone members provided with a sprayed-on molybdenum layer and the other friction cone member being unhardened and having a manganese-alloyed carbon steel sprayed thereon, the engagement of these two surfaces creating a favorable coefficient of friction for use in synchronizing couplings.

Further advantages and characteristics of the invention can be taken from the following description.

BRIEF DESCRIPTION OF THE DRAWING

The invention will be discussed in connection with one sketched exemplary embodiment.

In the drawing

FIG. 1 illustrates a pair of friction cone rings, which are assembled for installation into a synchronizing device;

FIG. 2 illustrates a synchronous ring which cooperates with one of the friction cone rings illustrated in FIG. 1;

FIG. 3 illustrates in an enlarged scale a detail of a friction cone ring with an applied friction surface; and FIG. 4 illustrates a detail of a synchronous ring with an applied friction surface in the scale of FIG. 3.

DETAILED DESCRIPTION

FIG. 1 illustrates a pair of friction cone rings 1 and 2, as they are used for synchronizing friction cone couplings in synchronizing devices. The friction cone rings 1 and 2 are fixedly connected at spaced intervals by a number of carrier pins 3. A shifting sleeve 4 is provided between the friction cone rings and is guided for axial movement therebetween. The shifting sleeve 4 has internal teeth 5 for engagement with a not illustrated clutch gear which is positioned fixedly on a shaft to be coupled (see U.S. Pat. No. 3,910,390 for a known arrangement). The shifting sleeve 4 has a number of circumferentially spaced holes 6, 7 therein. The abovementioned carrier pins extend through a number of these holes 6. The carrier pins have an annular groove 8 in the central periphery thereof. The other mentioned holes 7 have axially-split pin devices 15 extending therethrough. The split pin devices 15 engage on both semicylindrical sides thereof the internal surface of the holes 7 in the friction cone rings. The friction cone rings each cooperate with one synchronous ring 9 of which one is illustrated in FIG. 2. The synchronous rings 9 are drawn or stamped from sheet metal and are cup-shaped. While the friction cone rings 1 and 2 have an external cone surface 10 in the synchronizing cone friction coupling, the synchronous rings 9 each have an inner cone 11 which cooperates with said outer cone. That is, the angle of the conical surfaces 10 and 11 are the same to facilitate a proper fit when engaged with each other. The snychronous rings 9 have internal teeth 12 which engage corresponding coupling teeth of the gear to be clutched. After synchronization by means of the synchronizing friction cone coupling, a positive coupling takes place by moving the shifting sleeve axially to connect the internal teeth thereof to the teeth of the clutch gear and to the gear which is to be clutched. The operation of such a synchronizing device is known (for example, German Gm 73 11 653 and the above-referenced U.S. Pat. No. 3,910,390).

A layer of molybdenum 13 is sprayed onto the inner cone surface 11 of the synchronizing rings 9. This layer is subsequently ground.

A relatively thin not shown layer of molybdenum is first sprayed onto the outer cone surface 10 of the friction cone rings 1 or 2 in order to increase the adhesion of the following layer. Then a layer of manganese-alloyed carbon steel 14 is applied by spraying, which layer is also subsequently ground. Particularly advantageous is a carbon steel with 0.7 to 0.9 percent C. and 0.6 to 0.8 percent Mn., wherein 0.8 percent C. and 0.7 percent Mn. have proven to be particularly good. The layers of molybdenum and carbon steel can also be exchanged on the outer and inner cone surfaces.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a synchronizing device for a gear shift mechanism having at least one synchronizing friction cone coupling consisting of a cone ring having an external cone surface and a synchronous ring having a matching inner cone surface, at least one of said inner cone surface and said outer cone surface having a sprayed-on wear-resistant and frictionally favorable molybdenum layer thereon, the improvement comprising wherein a layer of manganese-alloyed carbon steel is sprayed onto the other of said inner cone surface and said outer cone surface, said other cone surface being unhardened.

2. The improved synchronizing device according to claim 1, wherein said manganese-alloyed carbon steel layer consists of steel with 0.7 to 0.9 percent carbon and 0.6 to 0.8 percent manganese.

3. The improved synchronizing device according to claim 2, wherein said layer having said manganese-alloyed carbon steel thereon is said inner cone surface.

4. The improved synchronizing device according to claim 2, wherein said layer having said manganese-alloyed carbon steel thereon is said outer cone surface.

5. The improved synchronizing device according to claim 1, wherein said manganese-alloyed carbon steel consists of steel with 0.8 percent carbon and 0.7 percent manganese.

6. The improved synchronizing device according to claim 1, wherein said other cone surface has a thin layer of molybdenum thereon on top of which is a thin layer of 0.7 to 0.9 percent carbon and 0.6 to 0.8 percent manganese, said molybdenum functioning as a bonding agent between said other cone surface and said thin layer of combined carbon and manganese.

* * * * *